March 13, 1962 P. F. GIRARD 3,025,022
DELTA WING HELIPLANE
Filed Jan. 16, 1961 2 Sheets-Sheet 1

INVENTOR.
PETER F. GIRARD
BY
Knox & Knox

March 13, 1962  P. F. GIRARD  3,025,022
DELTA WING HELIPLANE

Filed Jan. 16, 1961  2 Sheets-Sheet 2

INVENTOR.
PETER F. GIRARD
BY Knox & Knox

United States Patent Office 3,025,022
Patented Mar. 13, 1962

3,025,022
DELTA WING HELIPLANE
Peter F. Girard, La Mesa, Calif., assignor to The Ryan Aeronautical Co., San Diego, Calif.
Filed Jan. 16, 1961, Ser. No. 82,778
5 Claims. (Cl. 244—7)

The present invention relates generally to aircraft and more particularly to a delta wing heliplane.

Helicopters are capable of vertical take-off and landing with reasonable efficiency and load carrying capacity, but are limited in their forward speed since the lifting rotor also provides forward thrust, and is operated inefficiently in this capacity. Compound aircraft or convertiplanes which use conventional propellers in addition to the lifting rotors are also limited in forward speed by the drag of the large rotors, which normally autorotate in forward flight. An ideal combination would be an aircraft having the vertical lift characteristics of a helicopter and using an efficient propeller for forward flight thrust, yet without the drag of a lifting rotor in forward flight.

The primary object of this invention therefore, is to provide a heliplane type aircraft having a pair of delta wings which provide lift for the aircraft in forward flights with the wings fixed, the wings also having movable tips which act as propeller blades and being rotatable in opposite directions for vertical thrust in the manner of a helicopter.

Another object of this invention is to provide a heliplane in which a conventional propeller is used for forward thrust and is actuated in conjunction with the lifting wing rotors for transition from vertical to horizontal flight and vice versa, the counter-rotating wing rotors eliminating the need for anti-torque means.

Another object of this invention is to provide a heliplane in which a single engine may be used to drive the wing rotors and the propeller, the full power being available to the propeller when the wings are stationary.

A further object of this invention is to provide a heliplane which is operated in the manner of a helicopter in a vertical flight and by aerodynamic means in forward flights, conventional controls being used for simplicity.

Finally, it is an object to provide a heliplane of the aforementioned character and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawing.

Figure 1:
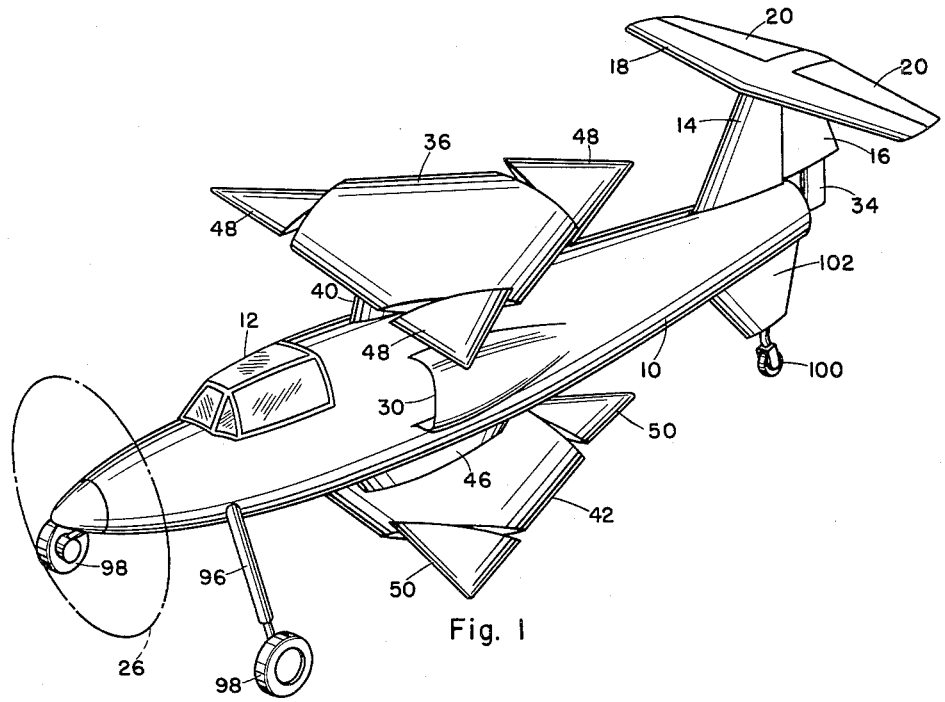
FIGURE 1 is a perspective view of the heliplane in vertical flight configuration.
Figure 2:
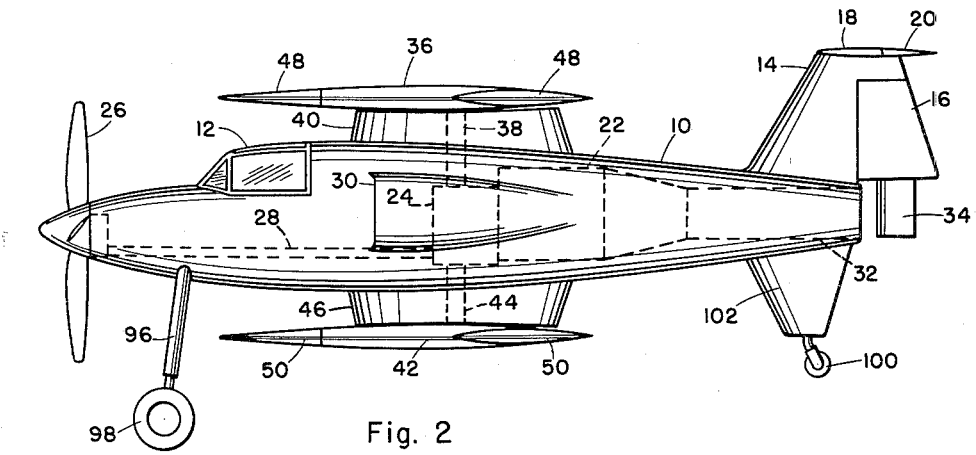
FIGURE 2 is a side elevation view of the heliplane as in forward flight.
Figure 3:
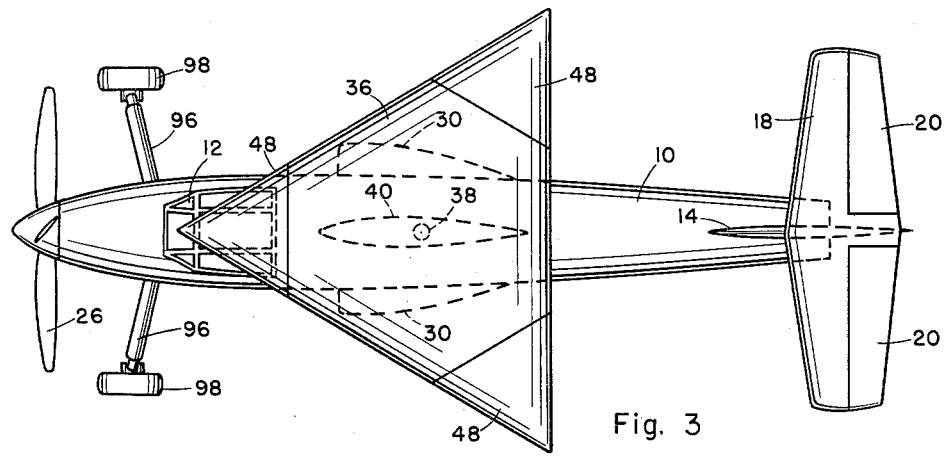
FIGURE 3 is a top plan view thereof.

The heliplane has a fuselage 10 with a forward cabin 12 and is provided with a tail assembly comprising a fin 14 and rudder 16, with a tailplane 18 mounted on top of the fin, said tailplane carrying elevons 20 which function as elevators and ailerons in the well known manner. Mounted in the fuselage 10 is a turboprop engine 22 of suitable type, the engine being mounted rearwardly of the cabin 12 and having a gear box 24 from which a nose mounted propeller 26 is driven through an extension shaft 28. On the sides of the fuselage are air intakes 30 to duct air to the engine 22, the tailpipe 32 of said engine extending to the rear of the fuselage. Fixed below the rudder 16 and movable therewith is a sub-rudder 34, which is disposed in the exhaust gas stream from the tailpipe 32 and provides directional control at low speeds when the aerodynamic rudder is ineffective.

Mounted above the fuselage 10 is an upper wing 36 of equilateral triangular shape and attached at its geometrical center to a substantially vertical upper rotor shaft 38, the wing being spaced above the fuselage by a streamlined pylon 40 which encloses the shaft. Below the fuselage 10 is a lower wing 42, also of triangular shape and symmetrically mounted on a lower rotor shaft 44 coaxial with shaft 38, the shaft 44 being enclosed by a streamlined pylon 46. Both wings are similar in size and construction, the upper wing having movable tips 48 and the lower wing having movable tips 50, all of equal size and each of the movable tips being pivotal on a substantially radial axis from the supporting shaft to the vertex of the tip. The wings are of substantially lenticular type airfoil section, the precise airfoil shape being dependent on size, performance and aerodynamic requirements of the aircraft. When the wings are rotated, the tips be angularly offset and act as rotor blades to provide vertical thrust in the manner of helicopter type rotors.

Figure 4:
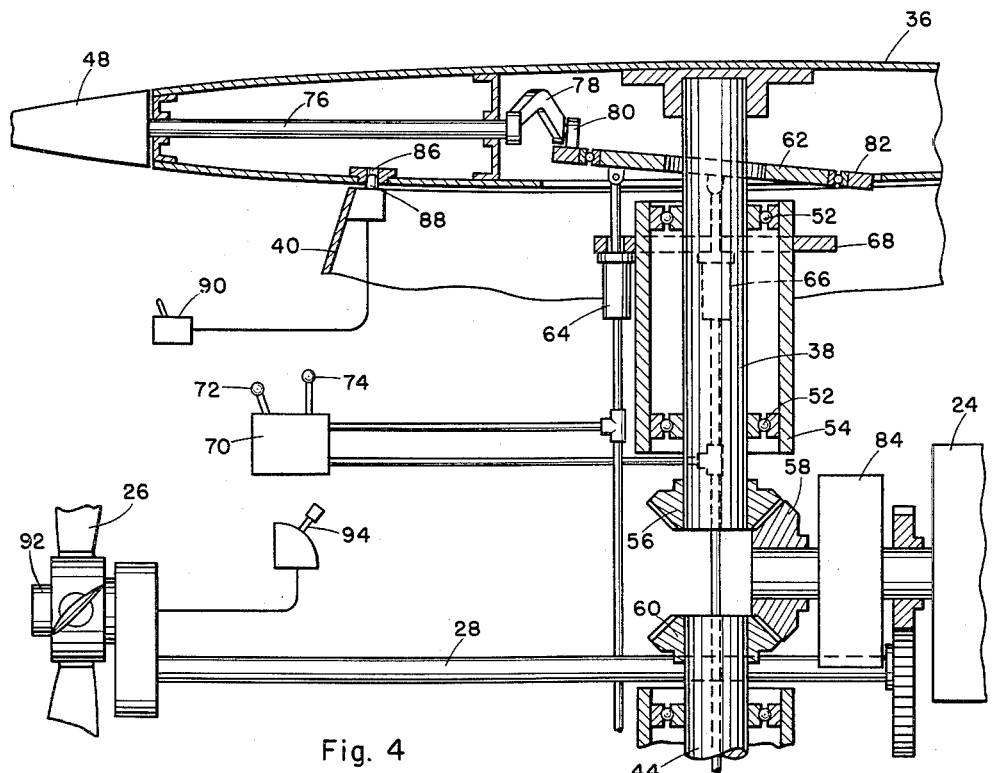
FIGURE 4 is a substantially diagrammatic view of the propulsion control system.

The mounting and actuating means for the wings is illustrated in FIGURE 4, which should be considered as diagrammatic since the structure may vary considerably. The upper wing 36 on its shaft 38 is carried by bearings 52 in a sleeve 54 which is a fixed part of the aircraft structure, the lower end of the shaft carrying a bevel gear 56 driven by a bevel drive gear 58 from the engine gear box 24. The lower shaft 44 is also fitted with a bevel gear 60 driven by the drive gear 58, so that the wings rotate in opposite directions in synchronization. Since the actuating mechanism for both wings is similar, only that for the upper wing 36 is illustrated and described.

Fitted around the upper end of the rotor shaft 38 is a circular swash plate 62 mounted on a pair of jacks 64 and 66, which are carried by a support flange 68 on the sleeve 54. The swash plate 62 is non-rotating and the jacks 64 and 66 are spaced 90 degrees apart around the axis of shaft 38, so that the swash plate can be tilted in two orthogonal planes. The jacks may be of fluid or electrically operated type and are actuated from a control box 70 having collective pitch and cyclic pitch control levers 72 and 74 respectively. Alternatively, the swash plate may be mechanically operated. Each tip 48 is mounted on a control shaft 76, at the inner end of which is a lever arm 78 pivotally connected to a lug 80 carried by an outer ring 82 freely rotatably mounted on and coplanar with the swash plate 62. Thus any inclination of the swash plate causes rotation of the tips about their respective axes as the wings rotate. The arrangement is similar to that used in conventional helicopter rotors in which the rotor blades have means for collective and cyclic pitch control. The operation of such systems is well known and need not be described in detail herein, many different types of mechanisms having been developed for the purpose.

To allow autorotation and disengagement of the wings, a clutch unit 84 of suitable type is mounted between the gear box 24 and drive gear 58. In forward flight, the wings are non-rotating and are stopped with one vertex forward to provide lift in the manner of conventional delta type wings. Each wing may be held by a simple socket member 86 fitted in the wing itself and engaged by a lock pin 88 mounted in the respective pylon, the lock pin being operated by a switch 90 convenient to the pilot.

The propeller 26 is provided with a pitch control unit 92 actuated by the usual control lever 94, according to well known practice, all of the controls being grouped in a suitable manner for easy access to the pilot. The controls for the aerodynamic tail surfaces are conventional and are omitted from the drawing for simplicity. The cyclic pitch control means may be interconnected with the controls for the elevons 20, if desired, but should be disengageable for cruising flight.

Various types of landing gear may be used, a simple fixed type being illustrated and including forward main legs 96 with wheels 98 and a tail wheel 100 carried on a fixed ventral fin 102, to provide clearance for the lower wing 42. Suitable retraction means may be used if desired.

For take-off, the wings 36 and 42 are rotated by the engine 22 with their tips 48 and 50 angularly offset, as in FIGURE 1. The tips act as rotor blades and provide vertical thrust to lift the heliplane vertically in the manner of a helicopter, the counter-rotation of the wings avoiding the need for any anti-torque means. The propeller 26 is set at zero pitch and produces virtually no thrust, the propeller being driven entirely independently of the wings. Pitch and roll motions are controlled by cyclic control of the wing tips, while yaw is controlled by deflection of the subrudder 34 in the exhaust gas stream.

When sufficient altitude is gained, the pitch of the propeller 26 is increased to provide forward motion and, as forward speed increases, the collective pitch of the tips 48 and 50 is gradually decreased. Eventually the wing tips are at zero pitch and the clutch with 84 is disengaged, allowing the wings to auto-rotate and provide aerodynamic lift, the propeller 26 absorbing the full engine power and the elevons 20 and rudder 16 being effective for directional control. The wings are then stopped and locked in place by means of the lock pins 88, the two delta wings providing all the necessary lift for the heliplane in high speed forward flight.

For landing, the procedure is reversed, the wings being unlocked and allowed to auto-rotate initially, the tips then being actuated and power applied to the wings to provide lift, while the pitch of propeller 26 is decreased to reduce forward speed. When forward speed is sufficiently reduced, the heliplane is landed in the manner of a helicopter. Thus the heliplane has the characteristics of a helicopter in take-off, landing and maneuverability at low speeds, with the advantages of a fixed wing aircraft in cruising flight at high speed.

To lift heavy loads the heliplane is capable of short take-off operation, rather than true vertical flight, which requires high power. In this configuration, the wings are rotated for vertical lift but a certain amount of power is utilized by the propeller 26 to develop forward thrust, so that the heliplane rolls forward on its landing gear. The central portion of each wing, although rotating, develops aerodynamic lift which adds to the vertical thrust effect of the wing tip portions and permits take-off in a minimum space.

It should be understood that the configuration of the heliplane as illustrated is merely an example of a functional design and that the rotatable triangular wings with movable tips, combined with means for forward thrust, may be arranged in various ways to suit specific requirements. The wings are preferably balanced about their axes of rotation, but any periodic vibration is minimized since the rotating wings are synchronized and counter-rotating. The proportional areas of the wings and tip portions are also subject to variation according to performance requirements and different arrangements of aerodynamic control surfaces can be utilized.

As a further example, the wings need not necessarily be above and below the fuselage, but could be on suitable supports on opposite sides of the fuselage in a common horizontal plane.

The operation of this invention will be clearly comprehended from a consideration of the foregoing description of the mechanical details thereof, taken in connection with the drawing and the above recited objects. It will be obvious that all said objects are amply achieved by this invention.

I claim:

1. In an aircraft: an airframe structure; a pair of substantially triangular wings mounted on said structure; said wings being rotatable about their perpendicular axes of symmetry; an engine operatively connected to rotate said wings synchronously in opposite directions; the tip portions of said wings being pivotally mounted to be inclined relative to the chord planes of the wings and constituting lifting rotor portions; and control means operatively connected to vary the inclination of said tip portions collectively and cyclically as said wings are rotating.

2. In an aircraft: an airframe structure; a pair of substantially triangular wings mounted on said structure; said wings being rotatable about their perpendicular axes of symmetry; an engine operatively connected to rotate said wings synchronously in opposite directions; the tip portions of said wings being pivotally mounted to be inclined relative to the chord planes of the wings and constituting lifting rotor portions; control means operatively connected to vary the inclination of said tip portions collectively and cyclically as said wings are rotating; and stop means operable to stop said wings rigidly each with one vertex disposed forwardly of the aircraft.

3. In an aircraft: an airframe structure; a pair of substantially triangular wings mounted on said structure; said wings being rotatable about their perpendicular axes of symmetry; an engine operatively connected to rotate said wings synchronously in opposite direction; the tip portions of said wings being pivotally mounted to be inclined relative to the chord planes of the wings and constituting lifting rotor portions; control means operatively connected to vary the inclination of said tip portions collectively and cyclically as said wings are rotating; propulsion means mounted on said structure to propel the aircraft forwardly; clutch means coupled to said engine to disengage said wings from driving connection therewith; and stop means operable to stop said wings rigidly each with one vertex disposed forwardly of the aircraft.

4. In an aircraft: a fuselage; an upper triangular wing spaced above said fuselage; a lower triangular wing spaced below said fuselage; said wings being rotatable on substantially vertical axes about their axes of symmetry; an engine mounted in said fuselage and operatively connected to rotate said wings synchronously in opposite directions; said wings having tip portions pivotally mounted on axes substantially radially of the axes of wing rotation; said tip portions being tiltable relative to said wings and constituting lifting rotor elements; control means operatively connected to said tip portions to vary the angular motion thereof collectively and cyclically as the wings are rotating; clutch means on said engine to disengage said wings from driving connection therewith; and stop means operative to stop said wings rigidly each with one vertex disposed forwardly of the aircraft.

5. In an aircraft: a fuselage; an upper triangular wing spaced above said fuselage; a lower triangular wing spaced below said fuselage; said wings being rotatable on substantially vertical axes about their axes of symmetry; an engine mounted in said fuselage and operatively connected to rotate said wings synchronously in opposite directions; said wings having tip portions pivotally mounted on axes substantially radially of the axes of wing rotation; said tip portions being tiltable relative to said wings and constituting lifting rotor elements; control means operatively connected to said tip portions to vary the angular motion thereof collectively and cyclically as the wings are rotating; clutch means on said engine to disengage said wings from driving connection therewith; stop means operative to stop said wings rigidly each with one vertex disposed forwardly of the aircraft; and propulsion means operable independently of said wings to propel the aircraft forwardly.

References Cited in the file of this patent
UNITED STATES PATENTS

| | | |
|---|---|---|
| 1,546,443 | Glessner | July 21, 1925 |
| 1,578,168 | Pescara | Mar. 23, 1926 |
| 1,688,186 | Humphreys | Oct. 16, 1928 |
| 2,835,331 | Ryan et al. | May 20, 1958 |
| 2,928,238 | Hawkins | Mar. 15, 1960 |